United States Patent
Gorek et al.

(10) Patent No.: US 7,554,329 B2
(45) Date of Patent: Jun. 30, 2009

(54) METHOD AND APPARATUS FOR DETERMINING FORMATION RESISTIVITY AHEAD OF THE BIT AND AZIMUTHAL AT THE BIT

(75) Inventors: Matthias Gorek, Hannover (DE); Christian Fulda, Sehnde (DE)

(73) Assignee: Baker Hughes Incorporated, Houston, TX (US)

( * ) Notice: Subject to any disclaimer, the term of this patent is extended or adjusted under 35 U.S.C. 154(b) by 124 days.

(21) Appl. No.: 11/687,470

(22) Filed: Mar. 16, 2007

(65) Prior Publication Data

US 2007/0236222 A1 Oct. 11, 2007

Related U.S. Application Data

(60) Provisional application No. 60/790,363, filed on Apr. 7, 2006.

(51) Int. Cl.
*G01V 3/18* (2006.01)
*G01V 3/38* (2006.01)
*E21B 47/12* (2006.01)

(52) U.S. Cl. .................................... 324/369; 175/50
(58) Field of Classification Search ................ 324/347, 324/354, 355, 356, 357, 366, 370, 373; 175/50; 166/254.1, 254.2
See application file for complete search history.

(56) References Cited

U.S. PATENT DOCUMENTS

| | | | |
|---|---|---|---|
| 2,181,601 A | 11/1939 | Jakosky | |
| 3,365,658 A | 1/1968 | Birdwell | 324/10 |
| 4,475,591 A * | 10/1984 | Cooke, Jr. | 166/254.1 |
| 5,235,285 A | 8/1993 | Clark et al. | 324/342 |
| 5,339,036 A | 8/1994 | Clark et al. | 324/338 |
| 5,339,037 A | 8/1994 | Bonner et al. | 324/366 |
| 5,359,324 A | 10/1994 | Clark et al. | 340/854.3 |
| 5,720,355 A * | 2/1998 | Lamine et al. | 175/27 |
| 5,813,480 A * | 9/1998 | Zaleski et al. | 175/40 |
| 6,064,210 A | 5/2000 | Sinclair | |
| 6,359,438 B1 | 3/2002 | Bittar | 324/369 |
| 6,384,605 B1 | 5/2002 | Li | 324/338 |
| 6,850,068 B2 | 2/2005 | Chemali et al. | 324/369 |
| 7,350,568 B2 * | 4/2008 | Mandal et al. | 166/254.2 |
| 7,394,257 B2 * | 7/2008 | Martinez et al. | 324/356 |
| 2004/0104726 A1 | 6/2004 | Chemali et al. | |

OTHER PUBLICATIONS

S. Bonner et al; *A New Generation of Electrode Resistivity Measurements for Formation Evaluation While Drilling*, SPWLA 35th Annual Logging Symposium, Jun. 19-22, 1994, pp. 1-25, Figs.

* cited by examiner

*Primary Examiner*—Kenneth J Whittington
(74) *Attorney, Agent, or Firm*—Madan & Sriram, P.C.

(57) ABSTRACT

A method and apparatus for obtaining a resistivity measurement of an earth formation surrounding a borehole in an MWD device uses the drillbit and the adjacent portion of the drill collar as a focusing electrode for focusing the measure current from a measure electrode on the face or side of the drillbit. This provides the ability to see ahead of and azimuthally around the drillbit.

20 Claims, 5 Drawing Sheets

METHOD AND APPARATUS FOR DETERMINING FORMATION RESISTIVITY AHEAD OF THE BIT AND AZIMUTHAL AT THE BIT

CROSS-REFERENCES TO RELATED APPLICATIONS

This application claims priority from U.S. patent application Ser. No. 60/790,363 filed on Apr. 7, 2006.

BACKGROUND OF THE INVENTION

1. Field of the Invention

This invention generally relates to exploration for hydrocarbons involving electrical investigations of a borehole penetrating an earth formation. More specifically, this invention relates to an instrumented bit on a tool moving along the borehole within an earth formation for introducing and measuring individual survey currents injected into the wall of the borehole. Additional measurement sensors may also be provided.

2. Background of the Art

Electrical earth borehole logging is well known and various devices and various techniques have been described for this purpose. Broadly speaking, there are two categories of devices used in electrical logging devices. In the first category, called "galvanic" devices, electrodes emit current into the earth formations in order to determine resistivity. One of the simplest forms of galvanic devices is the so-called "normal" device where a current electrode emits a current through the earth formation to a remote return location, and a voltage electrode measures the potential due to that current with respect to the remote reference location. In the second category, inductive measuring tools, an antenna within the measuring instrument induces a current flow within the earth formation. Resistivity can be determined by measuring either the magnitude or the attenuation caused by propagation of this current by means of the same antenna or separate receiver antennas. Various illustrative embodiments of the present invention belong to the first category, galvanic devices, as described in more detail below.

Normal type devices have been used extensively in the logging industry to determine formation resistivity when the borehole fluid is either more resistive or is slightly less resistive than the formation. One of the earlier devices was that of Doll wherein a so-called "micronormal" tool was used for measuring resistivity near the borehole wall.

Some galvanic devices are designed to focus the survey current into the formation whose resistivity is to be determined. For example, Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Other galvanic devices focus the current near the borehole wall. This is useful when the mud resistivity is much lower than the formation resistivity.

U.S. Pat. No. 6,050,068 to Chemali et al., having the same assignee as the present invention, the contents of which are incorporated herein by reference, teaches an apparatus for making measurements of the resistivity of an earth formation during the drilling process. A drill bit is conveyed on a bottom assembly for the purpose of drilling the borehole. At least one measure electrode is carried on an exterior surface of the drillbit and is used to convey a measure current into the formation. A device set in a cavity of the drillbit is responsive to at least one of (i) the current, and, (ii) the voltage of the at least one measure electrode. The response of this device indicates a measurement of resistivity of the formation near the borehole. A source of voltage coupled to the at least one electrode provides a specified voltage to the at least one electrode. The device disclosed in Chemali is an unfocused device. Consequently, there may be variations in the measured resistivity due to changes in standoff of the electrode during rotation of the tool. It may be desirable to reduce the effect of the standoff. Those versed in the art and having benefit of the present invention would recognize that standoff at the bit may be caused by bouncing of the bit during drilling.

SUMMARY OF THE INVENTION

One embodiment of the disclosure is an apparatus for making measurements of an earth formation during drilling of a borehole. The apparatus includes a drillbit conveyed on a bottomhole assembly (BHA). An electrode on the drillbit is configured to convey a measure current into the earth formation, the electrode being electrically isolated from the drillbit. A power source is configured to generate the measured current and maintain the drill bit at a potential having a value substantially equal to a potential of the electrode. The apparatus also includes a processor configured to use the value of the potential and a value of the current to estimate the value of the parameter of interest, and record the estimated value on a suitable medium. The parameter of interest may be a resistivity of the earth formation, a conductivity of the earth formation, a distance to an interface in the earth formation and/or a resistivity image of the formation. The apparatus may further include an orientation sensor on the BHA, the electrode being at a side of the drill bit, and wherein the processor is further configured to compress and telemeter a resistivity image of the formation to a surface location. The processor may be further configured to estimate the value of the parameter of interest using a calibration factor determined from a measurement in a medium of known resistivity. The orientation sensor may be an accelerometer, a magnetometer and/or a gyroscope. The power source may further include a toroidal coil. The apparatus may further include a current measuring device configured to provide the value of the measure current. The processor may be further configured to control a direction of drilling of the BHA based on a determined distance to an interface in the earth formation and/or a resistivity image of the formation.

Another embodiment is a method of measuring a parameter of interest of an earth formation during the drilling of a borehole. The method includes conveying a drillbit on a BHA into the borehole. A measure current is conveyed into the earth formation using an electrode on and electrically isolated from the drillbit. The measure current is focused, and an estimate is made of the value of the parameter of interest using a value of the potential of the electrode and a value of the current. The estimated value of the parameter of interest is recorded on a suitable medium. Focusing the measured current may be done by maintaining the drillbit at a potential having a value substantially equal to the potential of the electrode. The parameter of interest may be a resistivity of the earth formation, a conductivity of the earth formation, a distance to an interface in the earth formation and/or a resistivity image of the formation. The method may further include measuring an orientation of the BHA, conveying the measure current from a side of the drillbit, and compressing and telemetering a resistivity image of the formation to a surface location. Estimating the value of the parameter of interest may be further based on using a calibration factor determined from a measurement in a medium of known resistivity. Measuring the orientation of the BHA may be based on using an orientation sensor that may be an accelerometer, a magnetometer and/or a gyroscope. The measure current may be generated using a toroidal coil. A value of the measure current may be provided by using a current measuring device. The method may further include controlling a direction of drilling off the BHA based on a determined distance to an interface in the earth formation and/or a resistivity image of the formation.

Another embodiment is a computer-readable medium for use with an apparatus for making measurements of a parameter of interest of an earth formation. The apparatus includes a drillbit conveyed on a BHA. An electrode on the drillbit is configured to convey a measure current into the earth formation, the electrode being electrically isolated from the drillbit. A power source is configured to generate a measure current and maintain the drillbit at a potential having a value substantially equal to a potential off the electrode. The medium includes instructions which enable a processor to use the value of the potential and a value of the current to estimate a value of the parameter of interest, and to record the estimated value of the parameter of interest on a suitable medium. The medium may include a ROM, an EPROM, an EEPROM, a flash memory and/or an optical disk.

BRIEF DESCRIPTION OF THE FIGURES

The present invention is best understood with reference to the following figures in which like numerals refer to like elements.

DETAILED DESCRIPTION OF THE INVENTION

Figure 1:
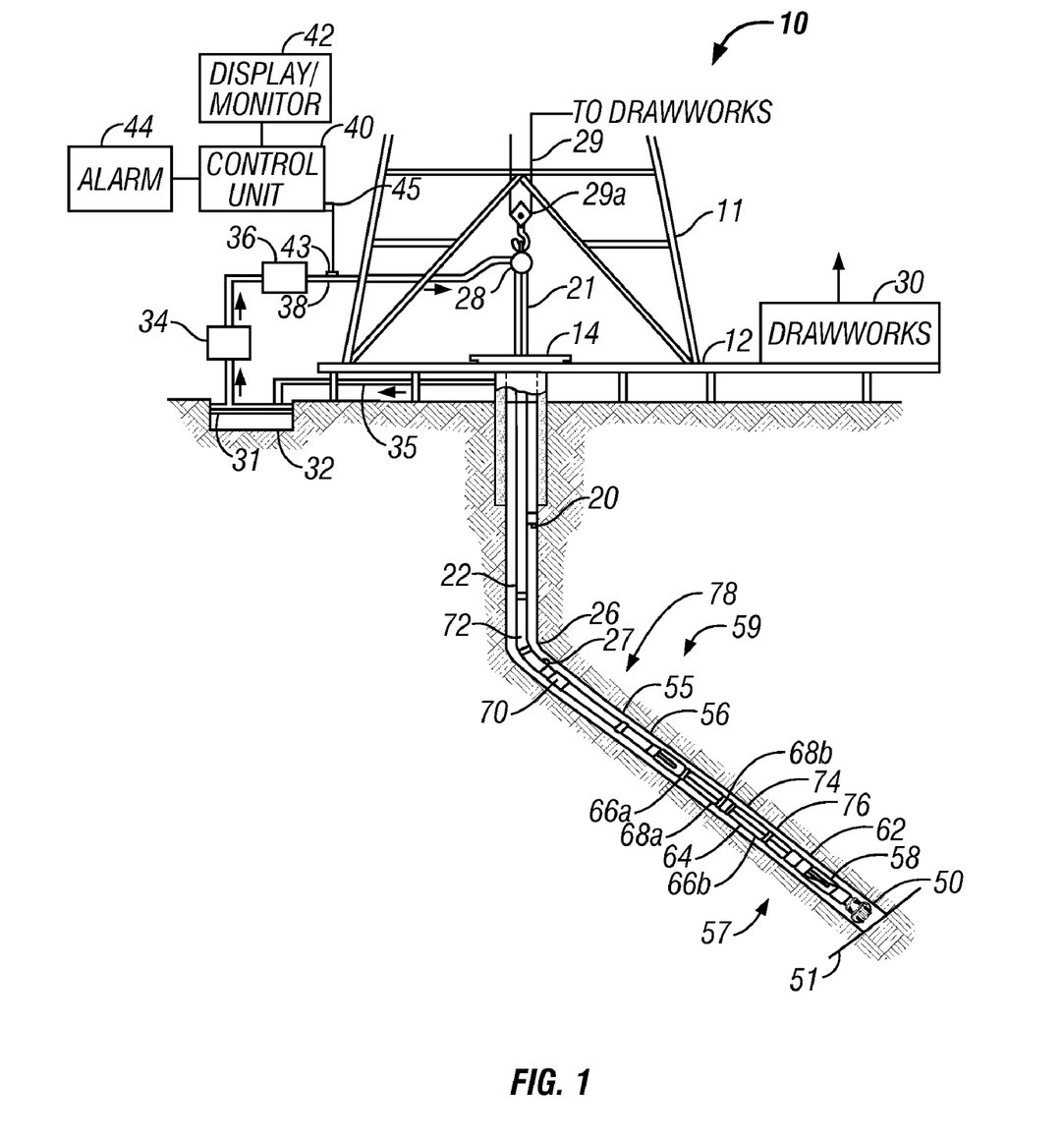
FIG. 1 is a schematic illustration of a drilling system that includes a resistivity logging tool according to various illustrative embodiments of the present invention.

FIG. 1 shows a schematic diagram of a drilling system 10 having a downhole assembly containing a sensor system and the surface devices according to one embodiment of present invention. As shown, the system 10 includes a conventional derrick 11 erected on a derrick floor 12 that supports a rotary table 14 that is rotated by a prime mover (not shown) at a desired rotational speed. A drillstring 20 that includes a drill pipe section 22 extends downward from the rotary table 14 into a borehole 26. A drill bit 50 attached to the drillstring 20 downhole end disintegrates the geological formations when it is rotated. The drillstring 20 is coupled to a drawworks 30 via a kelly joint 21, swivel 28 and line 29 through a system of pulleys 29a. During the drilling operations, the drawworks 30 is operated to control the weight on bit and the rate of penetration of the drillstring 20 into the borehole 26. The operation of the drawworks 30 is well known in the art and is thus not described in detail herein.

During drilling operations a suitable drilling fluid (commonly referred to in the art as "mud") 31 from a mud pit 32 is circulated under pressure through the drillstring 20 by a mud pump 34. The drilling fluid 31 passes from the mud pump 34 into the drillstring 20 via a desurger 36, fluid line 38 and the kelly joint 21. The drilling fluid 31 is discharged at the borehole bottom 51 through an opening in the drill bit 50. The drilling fluid 31 circulates uphole through the annular space 27 between the drillstring 20 and the borehole 26 and is discharged into the mud pit 32 via a return line 35. Preferably, a variety of sensors (not shown) are appropriately deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 and processes such signals according to programmed instructions provided to the surface control unit 40. The surface control unit 40 displays desired drilling parameters and other information on a display/monitor 42 which information is utilized by an operator to control the drilling operations. The surface control unit 40 contains a computer, memory for storing data, data recorder(s) and/or other peripherals. The surface control unit 40 also includes models and processes data according to programmed instructions and responds to user commands entered through a suitable means, such as a keyboard. The control unit 40 is preferably adapted to activate alarms 44 when certain unsafe or undesirable operating conditions occur. Those versed in the art would recognize that if a mud motor is used, there is relative rotation between the drillbit and the drillstring and provision has to be made for transfer of signals between the drillbit and the drillstring. This transfer may be made using electromagnetic telemetry.

A drill motor or mud motor 55 coupled to the drill bit 50 via a drive shaft (not shown) disposed in a bearing assembly 57 rotates the drill bit 50 when the drilling fluid 31 is passed through the mud motor 55 under pressure. The bearing assembly 57 supports the radial and axial forces of the drill bit 50, the downthrust of the drill motor 55, and the reactive upward loading from the applied weight on bit. A stabilizer 58 coupled to the bearing assembly 57 acts as a centralizer for the lowermost portion of the mud motor 55 assembly.

In one embodiment of the system, the downhole subassembly 59 (also referred to as the bottomhole assembly or "BHA"), which contains the various sensors and MWD devices to provide information about the formation and downhole drilling parameters and the mud motor 55, is coupled between the drill bit 50 and the drill pipe 22. The downhole assembly 59 preferably is modular in construction, in that the various devices are interconnected sections so that the individual sections may be replaced when desired. It may be necessary to assemble the cable for the bit electrode (discussed below) in all the other devices between the bit and the return electrode (also discussed below).

Still referring back to FIG. 1, the BHA 59 may also contain sensors and devices in addition to the above-described sensors. Such devices include a device 64 for measuring the formation resistivity near and/or in front of the drill bit 50, a gamma ray device 76 for measuring the formation gamma ray intensity, and devices, such as an inclinometer 74, for determining the inclination and/or the azimuth of the drillstring 20. The formation resistivity measuring device 64 is preferably coupled above the lower kick-off subassembly 62 that provides signals, from which the resistivity of the formation near or in front of the drill bit 50 is determined. A dual propagation resistivity device ("DPR") having one or more pairs of transmitting antennae 66a and 66b spaced from one or more pairs of receiving antennae 68a and 68b is used. Magnetic dipoles are employed that operate in the medium-frequency spectrum and the lower high-frequency spectrum. In operation, the transmitted electromagnetic waves are perturbed as they propagate through the formation surrounding the resistivity measuring device 64. The receiving antennae 68a and 68b detect the perturbed waves. Formation resistivity is derived from the phase and amplitude of the detected signals. The detected signals are processed by a downhole circuit and/or processor that is preferably placed in a housing 70 above the mud motor 55 and transmitted to the surface control unit 40 using a suitable telemetry system 72.

The inclinometer 74 and the gamma ray device 76 are suitably placed along the resistivity measuring device 64 for respectively determining the inclination of the portion of the drillstring 20 near the drill bit 50 and the formation gamma ray intensity. Any suitable inclinometer and gamma ray device, however, may be utilized for the purposes of various illustrative embodiments of the present invention. In addition, an orientation device (not shown), such as a magnetometer, an accelerometer, or a gyroscopic device, may be utilized to determine the drillstring 20 azimuth. Such devices are known in the art and are, thus, not described in detail herein. In the above-described configuration, the mud motor 55 transfers power to the drill bit 50 via one or more hollow shafts that run through the resistivity measuring device 64. The hollow shaft enables the drilling fluid to pass from the mud motor 55 to the drillbit 50. In an alternate embodiment of the drillstring 20, the mud motor 55 may be coupled below resistivity measuring device 64 or at any other suitable place.

The drillstring 20 contains a modular sensor assembly, such as the formation resistivity measuring device 64, a motor assembly, such as the mud motor 55 assembly, and one or more kick-off subs, such as the lower kick-off subassembly 62, for example. In one embodiment, the sensor assembly includes a resistivity device, as described in more detail below, the gamma ray device 76, and the inclinometer 74.

The bottomhole assembly (BHA) 59 of the present invention includes a MWD section 78 that may include a nuclear formation porosity measuring device, a nuclear density device, and an acoustic sensor system placed above the mud motor 55 in the housing for the MWD section 78 for providing information useful for evaluating and testing subsurface formations along the borehole 26. The present invention may utilize any of the known formation density devices. Any prior art density device using a gamma ray source may be used. In use, gamma rays emitted from the source enter the formation where they interact with the formation and attenuate. The attenuation of the gamma rays is measured by a suitable detector from which density of the formation is determined.

The above-noted devices transmit data to the downhole telemetry system 72, which in turn transmits the received data uphole to the surface control unit 40. The downhole telemetry system 72 also receives signals and data from the uphole control unit 40 and transmits such received signals and data to the appropriate downhole devices. The present invention may use a mud pulse telemetry technique to communicate data from downhole sensors and devices during drilling operations. A transducer 43 placed in the mud supply line 38 detects the mud pulses responsive to the data transmitted by the downhole telemetry system 72. The transducer 43 generates electrical signals in response to the mud pressure variations and transmits such signals via a conductor 45 to the surface control unit 40. Other telemetry techniques such electromagnetic and acoustic techniques and/or any other suitable technique may be utilized for the purposes of this invention. The drilling assembly also includes a directional sensor. Without limiting the scope of the invention, the directional sensor can be a magnetometer of the inertial type.

Figure 2:
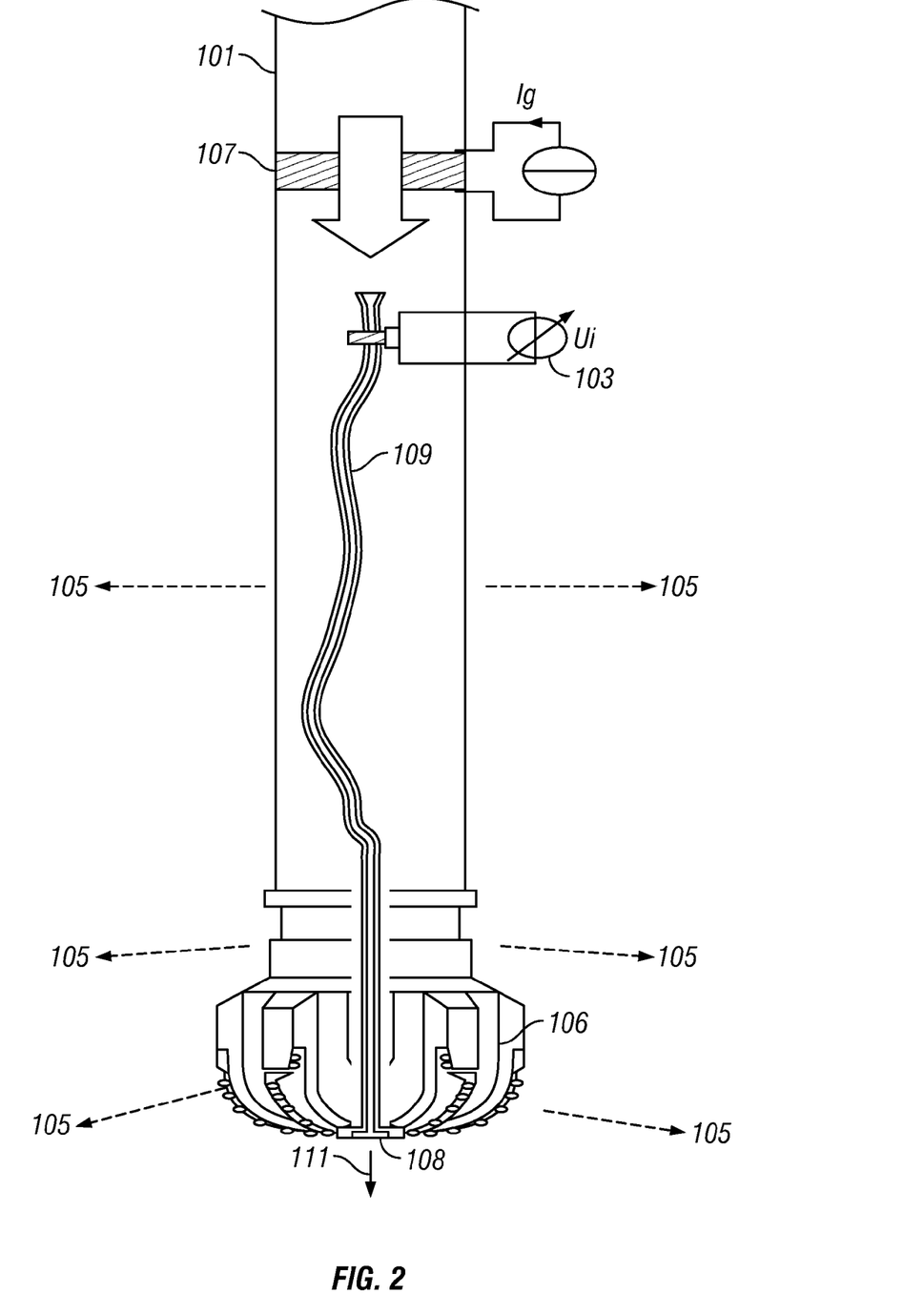
FIG. 2 is an illustration of one embodiment of the present invention in which a measure current ahead of the bit is focused using the drillbit.

The principle of the present invention is illustrated in FIG. 2. At a suitable location on the drillstring 20, a voltage source 107 is provided. In the example, the voltage source 107 is shown to be on and/or in a drill collar 101 and is part of the BHA 59. This is not to be construed as a limitation to the present invention. The voltage may be generated, for example, by using a toroidal coil mounted somewhere on and/or around the drillstring 20. This voltage source 107 generates a current in an axial direction in the drillstring 20 that flows in the direction of the drill bit 106 and returns on the opposite side of the voltage source 107 at a remote location. If the mud is conductive, the drill collar may act as the return. An electrical connection is provided between the voltage source 107 and bit 106 through the drill collar 101. For the purposes of the present invention, the voltage source 107 is also a power source since it generates a current in the drillstring 20. Inside the drillbit 106, an electrode 108 is installed at the bit face. The electrode 108 is isolated from the rest of the BHA 59 and connected through a cable 109 to a current measurement device 103 such as a toroidal coil mounted tightly around the cable 109, or around a measurement resistor (not shown) in series with the cable 109. The route taken by the cable 109 from the current measurement device 103 to the electrode 108 may be arbitrary, but the cable 109 should be isolated, such as by suitable electrical insulation, from the drill collar 101. On the other end of the cable 109 from the electrode 108, the current measurement device 103 is connected to electronic circuitry located in the drill collar 101 of the BHA 59. With this arrangement, the absolute potential of the drillbit 106 (and the adjacent portion of the drill collar 101) is about the same as the absolute potential of the electrode 108. This maintains a focusing condition for the current conveyed by the electrode 108, as discussed next.

With the configuration shown, the drillbit 106 and the adjacent portion of the drill collar 101 act as a focusing electrode that conveys a focusing current 105 in the direction generally indicated as shown in FIG. 2. It should be noted that the term "convey" is to be used in its broadest meaning and is intended to include current both into and out of the formation. As a result of the focusing provided by the focusing current 105, a measure current 111 from the electrode 108 is generally directed ahead of the drillbit 106. It is this forward direction of the measure current 111 that provides the ability of the present invention to see ahead of the drillbit.

An apparent resistivity p of the earth formation is then given by $$\rho_{app} = \frac{U}{I}, \tag{1}$$

where U is the voltage of the voltage source 107 and I is the measure current 111, for example, measured at the current measurement device 103. The actual resistivity of the earth formation is obtained as:

$$\rho = k\frac{U}{I}, \tag{2}$$

where k is a calibration factor. The calibration factor may be obtained, for example, by laboratory measurements made with the tool in a medium of known resistivity or by modeling.

Figure 3:
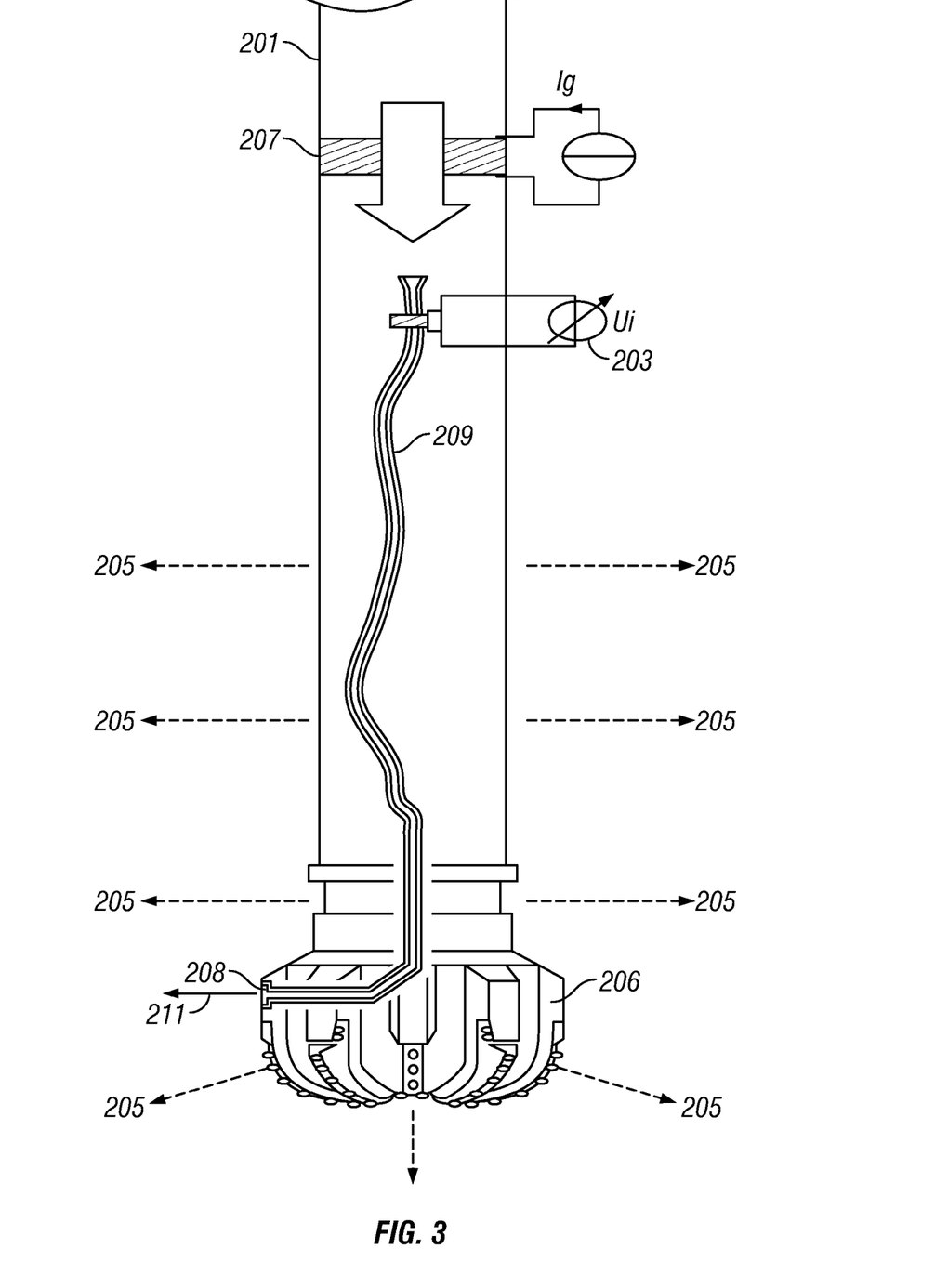
FIG. 3 is an illustration of an azimuthally sensitive implementation of the present invention in which a measure current is focused using the drillbit.

Another embodiment of the present invention is illustrated in FIG. 3. As in the embodiment of FIG. 2, an axial voltage source 207 is provided. In the example, the voltage source 207 is shown to be on and/or in the drill collar 201 and is part of the BHA 59. This is not to be construed as a limitation to the present invention. The voltage may be generated, for example, by using a toroidal coil around the drillstring 20. This voltage source 207 generates a current in an axial direction of the drillstring 20 that flows in the direction of the drillbit 206 and returns on the opposite side of the voltage source 207 at a remote location (see above). An electrical connection is provided between the voltage source 207 and bit 206 through the drill collar 203. Inside the drillbit 206, an electrode 208 is installed at a side of the drillbit 206. This is in contrast to the embodiment of FIG. 2 where the electrode 108 is at the bit face. The electrode 208 is isolated from the rest of the BHA 59 and connected through a cable 209 to a current measurement device 203 such as a toroidal coil mounted tightly around the cable 209, or around a measurement resistor (not shown) in series with the cable 209. The route taken by the cable 209 from the current measurement device 203 to the electrode 208 may be arbitrary, but the cable 209 should be isolated, such as by suitable electrical insulation, from the drill collar 201. On the other end of the cable 209 from the electrode 208, the current measurement device 203 is connected to electronic circuitry located in the drill collar 201 of the BHA 59.

The focusing current of the drillbit 206 and an adjacent portion of the drill collar 201 is indicated by 205. Due to the fact that the electrode 208 is on the side of the drillbit 206, the measure current 211 flows in a direction that is close to being radial. This direction of the measure current 211 provides the logging tool with azimuthal sensitivity.

As would be known to those first in the art, resistivity measurements made by an MWD device provide a better indication of formation resistivity (or, equivalently, conductivity) than wireline measurements. This is due to the fact that wireline measurements, which are made after an elapsed time from the drilling of the well, are affected by invasion of the formation by drilling fluids. In this regard, resistivity measurements made at the drill bit are even better.

Figure 4:
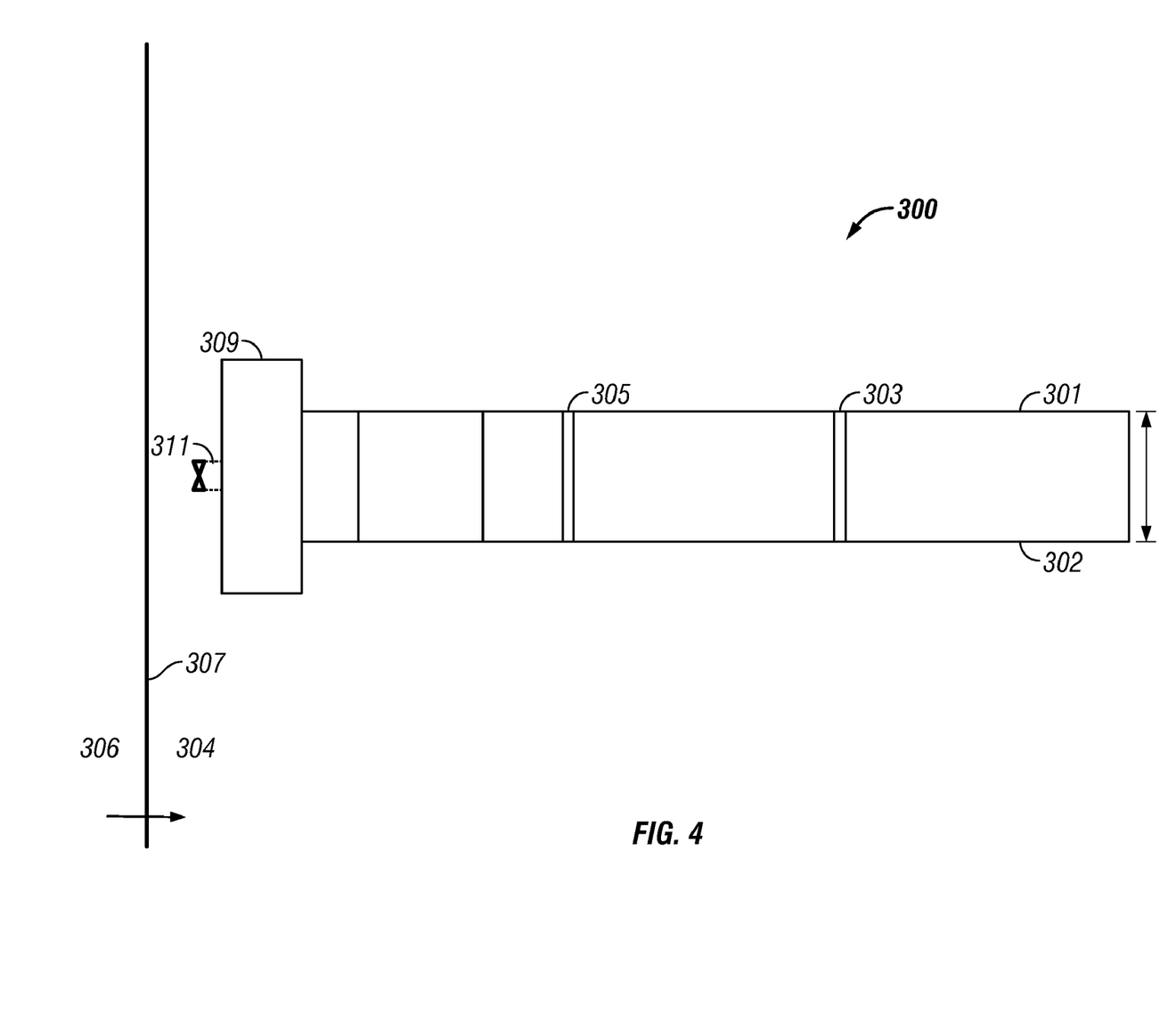
FIG. 4 is an illustration of the model of the drillbit and the measure electrode at the front of the bit used for simulation of the response of the resistivity logging tool of the present invention.

In order to demonstrate the "look ahead of the bit" capability of the invention, a numerical modeling was performed. The modeling includes a comparison with a prior art tool, which is only represented by its transmitter and receiver spacing. FIG. 4 shows the model of a logging tool 300 that was used. The modeling was done for a hole 26 of diameter 12.25 in (31.12 cm). The transmitter 303 generates a DC-voltage that is followed by a current through drillstring 301. The current returns at the return section 302 to the transmitter 303. The whole drillstring 301 is assumed ideally conductive and loss-free. Therefore, the potential below the transmitter 303 in bit 309 direction is equal on the logging tool 300. The current can be determined at the tool surface areas. Within the model, the complete borehole assembly (BHA) 59 (except for the drill bit 309) is surrounded by the drilling mud 31 of specific mud resistivity that is generally different of the formation resistivity. The simulation starts in a formation of 1 $\Omega$-m 304 formation resistivity. Another formation with a different resistivity 306 is shifted in the vertical direction in order to simulate the penetration of the bit and the tool through the boundary between the two formations 307. During the penetration, the current through the receiver 305 as well as through a measure electrode 311 is recorded.

Figure 5:
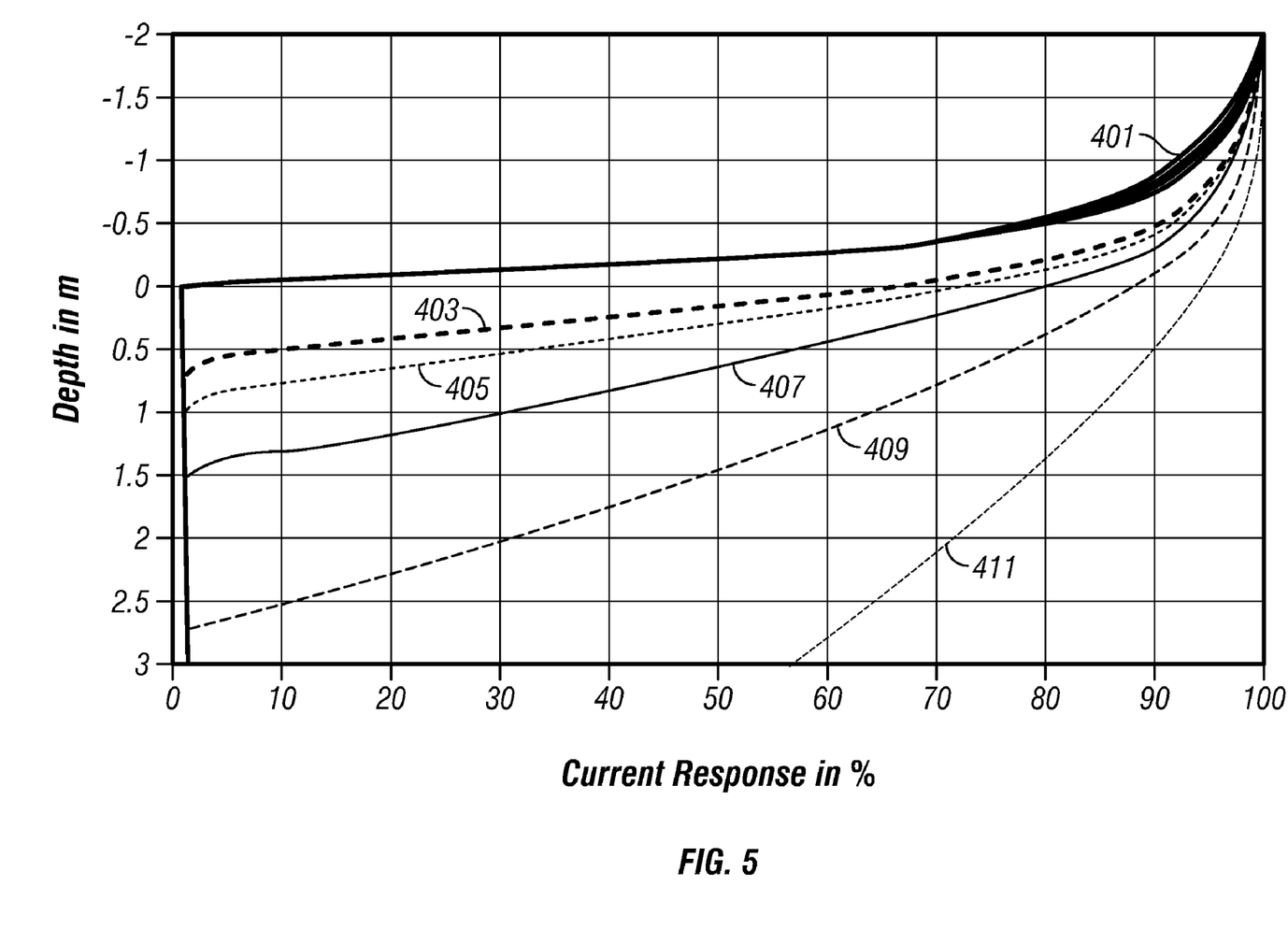
FIG. 5 shows a comparison of the current in the resistivity logging tool of the present invention to a bed boundary ahead of the drillbit with the response of a prior art logging tool.

FIG. 5 shows the current change at bit electrode compared to the conventional technique where the bit current is recorded at the receiver according to the model. The abscissa is the current response expressed as a percentage of the maximum response. The ordinate is the depth in meters (m). The curves 401 (there are five of them) are for various illustrative embodiments of the present invention with spacings of 0 m, 0.28 m, 0.87 m, 2.11 m and 4.75 m respectively between the drillbit and the receiver. The BHA 59 is moved from a formation of 1 $\Omega$-m formation resistivity to a formation of 100 $\Omega$-m formation resistivity. Negative values of depth mean that the BHA 59 is completely inside the 1 $\Omega$-m resistivity formation, the 0 value of depth means the bit touches the boundary of the 100 $\Omega$-m resistivity formation, and positive values of depth denote positions of the bit face in the 100 $\Omega$-m resistivity formation. The current is normalized to the current in the 1 $\Omega$-m resistivity formation at −2 m (100%). The curves 403, 405, 407, 409, and 411 are corresponding current responses at the receiver for the simulated prior art device.

As can be seen in FIG. 5, the current responses 401 for various illustrative embodiments of the present invention are almost independent of the distance between the drill bit 309 and the receiver 305. A small guard effect can be observed when the distance between bit and transmitter is elongated. However, the bit electrode is able to detect current changes of 20% half a meter before the bit touches the new formation, while the conventional technology using a ring receiver detects, at best (see curve 403), only a change of 10%. The 50% mark is reached at 25 cm before the new formation, for the present invention, while the prior art technique shows this change only after the bit has penetrated the new formation. When the bit face touches the new formation, the bit electrode indicates the end value of the current change while the conventional technique measures the end value more than 0.5 m after the new formation boundary. All results become worse for ring receiver measurement if space is added between bit and the ring receiver, as shown, for example, by the deterioration from the curve 403 to the curve 411.

In practice, a resistivity model of the earth formation is defined. This may be done using resistivity measurements from a previously drilled well in the vicinity, or from other information. Based on this resistivity model, the resistivity measured by the logging tool 300 of the present invention can be used to estimate a distance to an interface in the earth formation. The interface may be a bed boundary between formations having different resistivities or it may be a fluid interface in a formation with fluids of different resistivity on opposite sides of the interface. The logging tool 300 of various illustrative embodiments of the present invention is thus used to determine a parameter of interest of the earth formation such as a resistivity and/or a distance to an interface ahead of the drillbit in the earth formation.

The ability of the logging tool 300 of the present invention to see ahead of the drillbit may be utilized in reservoir navigation. When the measurements are made with a sensor assembly including the logging tool 300 mounted on the BHA 59 during drilling operations, the determined distance can be used by a downhole processor to alter the direction of drilling of the borehole 26. Alternatively, and/or additionally, the distance information may be telemetered to the surface where a surface processor 40 and/or a drilling operator can control the drilling direction. The method may also be used in wireline applications. For wireline applications the probe should be at the bottom of the hole to determine distances to bed boundaries away from the borehole 26. This may be useful in well completion, for example, in designing fracturing operations to avoid propagation of fractures beyond a specified distance. If the reservoir is detected ahead of the bit, a casing could be installed before penetration.

When orientation sensors are used for determining the orientation of the drill bit 50, this orientation information may be combined with resistivity information obtained from the current and voltage measurements to get an estimate of azimuthal variation of resistivity of the earth formation. A common cause of azimuthal resistivity variation is the presence of fine layers of different resistivities in the earth formation. When these are inclined to the borehole 26, an azimuthal variation in resistivity (typically as a sinusoidal variation) as measured by the device, such as the logging tool 300, of the present invention will result. This sinusoidal variation can be detected using known processing methods out of the noisy "signal." Suitable orientation sensors may be located on the drillstring 20 near the drill bit 50, or on the drive shaft of the drilling motor 55, if one is used. Such orientation sensors should be placed close enough to the drill bit 50 so that the orientation measurements are indicative of the drill bit 50 orientation and are not affected by twisting of the drillstring 20 or the motor 55 drive shaft. The resistivity image may also be used for geosteering by comparing an image obtained from the measurements with a modeled image derived from a subsurface model.

The measurements made downhole may be recorded on a suitable medium. A data may also be compressed and transmitted to a surface location. In the embodiment of the invention illustrated in FIG. 3, a method of data compression disclosed in U.S. patent application Ser. No. 10/892,011 (now U.S. Pat. No. 7,200,492) of Hassan et al. having the same assignee as the present invention and the contents of which are incorporated herein by reference, may be used. The method disclosed in Hassan is for exemplary purposes only and other methods may be used. Hassan discloses a method and apparatus for logging an earth formation and acquiring subsurface information wherein a logging tool is conveyed in borehole to obtain parameters of interest. The parameters of interest obtained may be density, acoustic, magnetic or electrical values as known in the art. The parameters of interest may be transmitted to the surface at a plurality of resolutions using a multi-resolution image compression method. Parameters of interest are formed into a plurality of cost functions from which regions of interest are determined to resolve characteristics of the features of interest within the regions. Feature characteristics may be determined to obtain time or depth positions of bed boundaries and borehole Dip Angle relative to subsurface structures, as well borehole and subsurface structure orientation. Characteristics of the features include time, depth, and geometries of the subsurface such as structural dip, thickness, and lithologies. At the surface, an image of the formation may be constructed. With either of the two embodiments discussed above, a log of resistivity may be produced. In addition, there are several well known uses for resistivity measurements: these include determination of formation hydrocarbon saturation. Knowledge of this saturation is extremely useful in reservoir development.

The processing of the data may be done by a downhole processor to give corrected measurements substantially in real time. Alternatively, the measurements could be recorded downhole, retrieved when the drillstring 20 is tripped, and processed using the surface processor 40. Implicit in the control and processing of the data is the use of a computer program on a suitable machine-readable medium that enables the processor to perform the control and processing. The machine-readable medium may include ROMs, EPROMs, EEPROMs, flash memories and optical disks.

While the foregoing disclosure is directed to the preferred embodiments of the present invention, various modifications will be apparent to those skilled in the art. It is intended that all variations within the scope and spirit of the appended claims be embraced by the foregoing disclosure.

What is claimed is:

1. An apparatus configured to make measurements of a parameter of interest of an earth formation during the drilling of a borehole therein, the apparatus comprising:
    (a) a drillbit configured to be conveyed on a bottomhole assembly (BHA) configured to drill the borehole;
    (b) an electrode on the drillbit configured to convey a measure current into the earth formation, the electrode being electrically isolated from the drillbit;
    (c) a power source configured to generate the measure current and maintain the drillbit at a potential having a value substantially equal to a potential of the electrode; and
    (d) a processor configured to:
        (A) use the value of the potential and a value of the current to estimate a value of the parameter of interest, and
        (B) record the estimated value of the parameter of interest on a suitable medium.

2. The apparatus of claim 1 wherein the parameter of interest is at least one of (i) a resistivity of the earth formation, (ii) a conductivity of the earth formation, (iii) a distance to an interface in the earth formation, and (iv) a resistivity image of the formation.

3. The apparatus of claim 1 further comprising an orientation sensor on the BHA, wherein the electrode is at a side of the drillbit and wherein the processor is further configured to compress and telemeter a resistivity image of the formation to a surface location.

4. The apparatus of claim 1 wherein the processor is further configured estimate the value of the parameter of interest by using a calibration factor determined from a measurement in a medium of known resistivity.

5. The apparatus of claim 3 wherein the orientation sensor is selected from the group consisting of (i) an accelerometer, (ii) a magnetometer, and (iii) a gyroscope.

6. The apparatus of claim 1 wherein the power source further comprises a toroidal coil.

7. The apparatus of claim 1 further comprising a current measuring device configured to provide the value of the measure current.

8. The apparatus of claim 1 wherein the processor is further configured to control a direction of drilling of the BHA based on at least one of: (i) a determined distance to an interface in the earth formation, and (ii) a resistivity image of the formation.

9. A method of measuring a parameter of interest of an earth formation during the drilling of a borehole therein, the method comprising:
    (a) conveying a drillbit on a bottomhole assembly (BHA) into the borehole;
    (b) conveying a measure current into the earth formation, using an electrode on and electrically isolated from the drillbit and at a potential having a value substantially equal to that of the drillbit;
    (c) focusing the measure current;
    (d) using a value of a potential of the electrode and a value of the current to estimate a value of the parameter of interest, and (e) recording the estimated value of the parameter of interest on a suitable medium.

10. The method of claim 9 wherein focusing the measure current further comprises maintaining the drillbit at a potential having a value substantially equal to the potential of the electrode.

11. The method of claim 9 wherein the parameter of interest is at least one of (i) a resistivity of the earth formation, (ii) a conductivity of the earth formation, (iii) a distance to an interface in the earth formation, and (iv) a resistivity image of the formation.

12. The method of claim 9 further comprising:
   (i) measuring an orientation of the BHA,
   (ii) conveying the measure current from a side of the drillbit, and
   (iii) compressing and telemetering a resistivity image of the formation to a surface location.

13. The method of claim 9 wherein estimating the value of the parameter of interest further comprises using a calibration factor determined from a measurement in a medium of known resistivity.

14. The method of claim 12 wherein measuring the orientation of the BHA further comprises using an orientation sensor is selected from the group consisting of (i) an accelerometer, (ii) a magnetometer, and (iii) a gyroscope.

15. The method of claim 9 further comprising generating the measure current using a toroidal coil.

16. The method of claim 9 further comprising using a current measuring device to provide the value of the measure current.

17. The method of claim 9 further comprising controlling a direction of drilling of the BHA based on at least one of: (i) a a determined distance to an interface in the earth formation, and (ii) a resistivity image of the formation.

18. The method of claim 9 further comprising setting a casing in the borehole based upon a determined distance to an interface in the earth formation.

19. A computer-readable medium accessible to a processor, the computer-readable medium including instructions which enable the processor to:
   use a value of a potential of a current electrode and a value of a current of the current electrode to estimate a value of a property of an earth formation, and
   record the estimated value of the property on a suitable medium;
   wherein the current electrode is positioned on a drillbit conveyed into a borehole on a bottomhole assembly, and the current electrode is electrically isolated from the drillbit and the potential of the current electrode is substantially the same as a potential of the drillbit.

20. The medium of claim 19 further comprising at least one of (i) a ROM, (ii) an EPROM, (iii) an EEPROM, (iv) a flash memory, and (v) an optical disk.

* * * * *

UNITED STATES PATENT AND TRADEMARK OFFICE
CERTIFICATE OF CORRECTION

PATENT NO. : 7,554,329 B2  
APPLICATION NO. : 11/687470  
DATED : June 30, 2009  
INVENTOR(S) : Matthias Gorek and Christian Fulda

It is certified that error appears in the above-identified patent and that said Letters Patent is hereby corrected as shown below:

Column 10, claim 4, line 38, "configured estimate" should read --configured to estimate--; and Column 11, claim 14, line 24, delete "is".

Signed and Sealed this

Twenty-fifth Day of August, 2009

David J. Kappos  
*Director of the United States Patent and Trademark Office*